United States Patent
Salamin et al.

(10) Patent No.: US 11,499,915 B2
(45) Date of Patent: Nov. 15, 2022

(54) DEVICE FOR THZ GENERATION AND/OR DETECTION AND METHODS FOR MANUFACTURING THE SAME

(71) Applicant: ETH ZÜRICH, ETH-Zentrum (CH)

(72) Inventors: Yannick Salamin, Zürich (CH); Ping Ma, Uster (CH); Ueli Koch, Winterthur (CH); Jürg Leuthold, Neerach (CH)

(73) Assignee: ETH ZÜRICH, Zürich (CH)

( * ) Notice: Subject to any disclaimer, the term of this patent is extended or adjusted under 35 U.S.C. 154(b) by 418 days.

(21) Appl. No.: 16/495,178

(22) PCT Filed: Mar. 20, 2018

(86) PCT No.: PCT/EP2018/056925
§ 371 (c)(1),
(2) Date: Sep. 18, 2019

(87) PCT Pub. No.: WO2018/172302
PCT Pub. Date: Sep. 27, 2018

(65) Prior Publication Data
US 2020/0408677 A1    Dec. 31, 2020

(30) Foreign Application Priority Data

Mar. 21, 2017   (CH) .................... 00374/17

(51) Int. Cl.
*G01N 21/3586*    (2014.01)
*G02F 1/035*    (2006.01)
(Continued)

(52) U.S. Cl.
CPC ......... *G01N 21/3586* (2013.01); *G02F 1/035* (2013.01); *G02F 1/05* (2013.01); *G02B 6/1226* (2013.01); *G02B 6/43* (2013.01)

(58) Field of Classification Search
CPC ....... G01N 21/3586; G02F 1/035; G02F 1/05; G02F 1/0508; G02F 1/225; G02B 6/1226; G02B 6/43
See application file for complete search history.

(56) References Cited

U.S. PATENT DOCUMENTS

2003/0133339 A1    7/2003    Estes et al.
2003/0223668 A1*   12/2003   Breukelaar ............. G02F 1/035
                                                            385/2
(Continued)

FOREIGN PATENT DOCUMENTS

CN    104733982 A  *  6/2015   ......... G01N 21/3581
JP    2005-311324      11/2005
(Continued)

OTHER PUBLICATIONS

International Preliminary Report on Patentability dated Sep. 24, 2019 (Sep. 24, 2019), Application No. PCT/EP2018/056925, 7 pages.
(Continued)

*Primary Examiner* — Marcus H Taningco
(74) *Attorney, Agent, or Firm* — Rankin, Hill & Clark LLP

(57) ABSTRACT

A terahertz device includes a first waveguide, which is a plasmonic waveguide, having a first core with a nonlinear material, such as a ferroelectric material, and having a cladding with a first cladding portion including, at a first interface with the first core, a first cladding material that is an electrically conductive material. The terahertz device can include an antenna having a first and a second arm (for receiving or for emitting or for both, receiving and emitting electromagnetic waves in the terahertz range); a first and a second electrode arranged close to the first waveguide.

24 Claims, 5 Drawing Sheets

(51) Int. Cl.
  *G02F 1/05*    (2006.01)
  *G02B 6/122*   (2006.01)
  *G02B 6/43*    (2006.01)

(56) References Cited

U.S. PATENT DOCUMENTS

| | | | |
|---|---|---|---|
| 2004/0069984 A1* | 4/2004 | Estes | B82Y 20/00 |
| | | | 257/E23.01 |
| 2008/0159342 A1 | 7/2008 | McCaughan et al. | |
| 2016/0048041 A1 | 2/2016 | Cunningham et al. | |

FOREIGN PATENT DOCUMENTS

| | | | |
|---|---|---|---|
| JP | 2010093062 A * | 4/2010 | G02F 1/025 |
| JP | 2011-203718 | 10/2011 | |
| JP | 2014165412 A * | 9/2014 | B82Y 20/00 |
| JP | 2014-207654 | 10/2014 | |
| JP | 2016057138 A * | 4/2016 | G01B 11/0641 |
| KR | 2 854 504 | 11/2004 | |
| WO | 2016/154764 | 10/2016 | |

OTHER PUBLICATIONS

European Office Action dated May 28, 2021, Application No. 18 712 572.9, 8 pages.

Burla et al., "Microwave Plasmonics: A Novel Platform for RF Photonics", IEEE, Oct. 31, 2016, pp. 259-262.

Salamin et al. "Direct Conversion of Free Space Millimeter Waves to Optical Domain by Plasmonic Modulator Antenna", Nano Letters, Nov. 19, 2015, vol. 15, pp. 8342-8346.

Salamin et al., "Direct RF-to-Optical Detection by Plasmonic modulator integrated into a four-leaf-clover antenna", Conference on Lasers and Electro-Optics (CLEO), Optical Society of America, Jun. 5, 2016, 2 pages.

Qasymeh, "Terahertz Generation in Nonlinear Plasmonic Waveguies", IEEE Journal of Quantum Electronics, Apr. 4, 2016, vol. 52, No. 4, 7 pages.

Li et al., "Structurally-tolerant vertical directional coupling between metal-insulator-metal plasmonic waveguide and silicon dielectric waveguide", Optics Express, Jul. 19, 2010, vol. 18, No. 15, 13 pages.

Leuthold, "Wired and Wireless High-Speed Communications Enabled by Plasmonics", 21st European Conference on Networks and Optical Communications (NOC), IEEE, 2016, 3 pages.

Haffner et al., "Low-toss plasmon-assisted electro-optic modulator", Nature, 2018, 17 pages.

Burla, et al., "Plasmonics for Next-Generation Wireless Systems", IEEE/MTT-S International Microwave Symposium, 2018, pp. 1308-1311.

* cited by examiner

DEVICE FOR THZ GENERATION AND/OR DETECTION AND METHODS FOR MANUFACTURING THE SAME

BACKGROUND OF THE INVENTION

Field of the Invention

The invention relates to nonlinear elements in which terahertz (THz) frequency electromagnetic waves interact with nonlinear material systems, and to terahertz waves' detection and generation including the same. It relates to nonlinear elements, and devices enabling the mapping of a terahertz wave onto an optical frequency carrier, and an optical signal to produce a terahertz signal. The invention relates to methods and apparatuses according to the opening clauses of the claims. The devices may find applications, e.g. in terahertz generation and terahertz sensing, terahertz imaging, terahertz communication and terahertz storage.

Description of Related Art

Terahertz waves, a part of the electromagnetic spectrum unexplored until a decade ago has attracted a lot of attention in recent years. Terahertz waves provide several advantages due to their short wavelength providing a strong advantage compared to microwave imaging, transparent property to a lot of materials, and strong sensitivity to a phase change of the material system. In addition, material systems can respond strongly to terahertz radiation due to molecular vibrational modes, or optical phonon vibrations in crystals. Therefore, strong interest in the science community to find low-cost, power efficient and compact terahertz devices for generation and detection of terahertz waves has driven the terahertz technology. An important step towards low-cost, power efficient and compact foot-print, is the chip-scale integration of such devices for terahertz wave detection and generation. Especially, of interest is a device implementation that can perform both, detection and generation, only by changing the optical signal from probe to pump signal.

So far, quite a few terahertz detection or generation technologies are related in one or the other way to the one of the two following approaches. Nonlinear terahertz generation and detection is achieved by using the second order nonlinearity of a nonlinear crystal, i.e., ZnTe, GaAs, etc. A short optical pulse, referred to as the pump signal and inherently broadband, propagating through such a nonlinear crystal produces terahertz radiation through self-mixing of all its frequency components. For detection of such a produced terahertz wave, the pump signal is split and used as a probe signal to co-propagate through a similar nonlinear crystal along with the terahertz wave to be detected. The produced electric field in the crystal by the terahertz wave induces birefringence in the crystal changing the refractive index for one polarization of the crystal. This induces a polarization rotation to the optical pump signal. By reading out the polarization rotation of the optical probe signal by means of optoelectronic conversion, one can deduce the amplitude of the terahertz field present in the crystal. Another technique to generate and detect terahertz signals is based on photoconductive antennas. An incident optical pump signal on a high mobility substrate, i.e., GaAs, produces charge carriers. In the presence of a strong electric field, these carriers separate rapidly, and their acceleration produces terahertz waves. The use of metallic antenna arms to collect the generated carriers and to increase the radiation efficiency of the produced terahertz signal has shown efficient terahertz generation. For detection, similar as for nonlinear detection, the optical pump is split and used to probe the terahertz signal in a high mobility semiconductor. When a terahertz field is incident on the antenna, producing an electric field between its arms, the generated charge carrier by the optical pump drift apart generating a current which can be read and related to the terahertz field amplitude. One major drawback of those terahertz systems is the necessity to have both signals, i.e., optical pump and terahertz wave, coherent for time and frequency spectroscopy. In addition, a multitude of different approaches for the generation of terahertz waves have been demonstrated. However, all these approaches are very costly and bulky, and require complex free space optical systems. Plasmonics has in recent years been used to enhance terahertz detection and generation, enabling smaller and more efficient devices. The combination of plasmonics with nonlinear crystals on a chip-scale integrated structure, remains a challenge.

SUMMARY OF THE INVENTION

Possible objects of the invention are one or more of:
to enable light modulation by terahertz waves;
to provide plasmonic or plasmonic-hybrid waveguides of high nonlinear conversion efficiency
to provide plasmonic or plasmonic-hybrid waveguide of small size;
to enable efficient terahertz wave detection and generation;
to integrate terahertz wave devices in standard semiconductor manufacturing processes, in particular in CMOS technology or in Micro-Electro-Mechanical System Technology or in Memory Technology;
in particular, corresponding devices in which terahertz waves interact with light shall be provided, as well as methods for the manufacturing of such devices.

Further objects and various advantages emerge from the description and embodiments below.

For example, the device (sometimes referred to as "element") in which terahertz waves interact with light includes a first antenna, which is a terahertz wave antenna, featuring a nonlinear material loaded plasmonic slot waveguide comprising:
a first core including a nonlinear material; and
a cladding including a first cladding portion comprising, at a first interface with the nonlinear material such as the ferroelectric material, a first cladding material having a high conductivity such as in a metal or semimetal or a highly doped semiconductor;
the element including a first and a second electrode forming the terahertz antenna produces an electric field in the nonlinear material when a terahertz wave is incident on the terahertz antenna. With an optical signal present in the nonlinear material, the terahertz wave and optical signal interact and induce a nonlinear phase shift or generates new waves, resulting in new optical signals carrying the information contained in the terahertz wave.

In instances, the nonlinear materials, and in particular the ferroelectric material can be grown, in particular epitaxially grown, on the substrate wafer, with zero or one or more intermediate layers present between the substrate and the ferroelectric materials, wherein the one or more intermediate layers, if present, are, e.g., spin coated, sputtered or grown, in particular epitaxially or solution grown, on the substrate, the substrate and the first core being stacked in a direction referred to as vertical direction, and directions perpendicular to the vertical direction are referred to as lateral directions.

In one embodiment, the substrate is made of a ferroelectric material. In particular, the substrate can be made of the same ferroelectric material as the ferroelectric material comprised in the first core. E.g., both, the ferroelectric material comprised in the first core and the ferroelectric material of the substrate, can be $LiNbO_3$, or $BaTiO_3$, or $(1-x)[Pb(Mg_{1/3}Nb_{2/3}O_3]-x[PbTiO_3]$ (with the same x); but other ferroelectric materials can be used, too. It can in particular be provided in such an embodiment, that no intermediate layer is present between the substrate and the ferroelectric material of the core.

In one embodiment, the substrate and the ferroelectric material comprised in the first core are different portions of one and the same ferroelectric single crystal, e.g., of one and the same crystal of $LiNbO_3$, or $BaTiO_3$, or $(1-x)[Pb(Mg_{1/3}Nb_{2/3}O_3]-x[PbTiO_3]$. The ferroelectric single crystal, being a unitary part, can provide in such an embodiment, that no intermediate layer is present between the substrate and the ferroelectric material of the core.

In one embodiment, the antenna includes two arms, the antenna gap forming the plasmonic slot filled with the nonlinear material.

In one embodiment, a second waveguide, which is provided for guiding photonic, or plasmonic, or plasmonic hybrid modes along propagation directions, can be present and typically manufactured on the same substrate wafer including the nonlinear (for example ferroelectric) materials. The second waveguide can be made of any material of the substrate wafer, including the ferroelectric material.

In an alternative, the aforementioned second waveguide can also be present on a second substrate wafer different from the substrate wafer including the nonlinear material. Coupling, e.g., evanescent coupling and/or butt coupling, between the second waveguide and the core of the first waveguide consisting of the nonlinear material is usually present when the photonic, or plasmonic, or plasmonic hybrid modes propagate in the second waveguide. The two substrate wafers may require being in close proximity to each other accomplished, e.g., by means of wafer bonding technique, including direct bonding technique or adhesive bonding technique which requires an adhesion layer.

The nonlinear materials used for interacting with terahertz wave can in particular be ferroelectric materials. The ferroelectric material could be any one, such as $LiNbO_3$, $KNO_3$, $KTa_xNb_{1-x}O_3$, $Ba_xSr_{1-x}TiO_3$, $SrBaNbO_3$, $K_3Li_2Nb_5O_{15}$, $K_xNa_{1-x}Sr_yBa_{1-y}$—$Nb_2O_6$, $KH_2PO_4$, $KH_2AsO_4$, $NH_4H_2PO_4$, $ND_4D_2PO_4$, $RbH_2AsO_4$, $KTiOPO_4$, $KTiOAsO_4$, $RbTiOPO_4$, $RbTiOAsO_4$, $CsTiOAsO_4$, $Pb(Zr_xTi_{1-x})O_3$, La-doped $Pb(Zr_xTi_{1-x})O_3$, $(1-x)[Pb(Mg_{1/3}Nb_{2/3}O_3)-x[PbTiO_3]$, or $(1-x)[Pb(Zr_{1/3}Nb_{2/3}O_3)-x[PbTiO_3]$, ($0<x<1$; $0<y<1$), but is not limited thereto. Also, ferroelectric materials can be synthetized artificially, based on non-ferroelectric materials. Moreover, ferroelectric materials are not necessarily in their phases exhibiting ferroelectricity but can be in any phases, provided that the materials exhibit the desired nonlinear effects. The metallic materials for electrodes and conductive claddings, respectively, can be Au, Ag, Pt, Al, Cu, W, and Ti, but are not limited to these aforementioned metals; preferably CMOS process-compatible metals such as Cu or W can be used. If a non-metallic electrically conductive material is used (e.g, as the material of the second electrode), it may be a conductive oxide such as $SrRuO_3$, $LaSrCoO_3$, $LaNiO_3$, indium tin oxide, or other conductive materials such as graphene, but it is not limited thereto. Non-metallic electrically conductive materials can be used as interfacial materials (cladding) at the ferroelectric material (core) to reduce leakage currents through the ferroelectric material.

Light to be modulated or used for the generation and detection of terahertz wave can in particular be infrared light, but more generally can be any electromagnetic radiation, in particular light in the infrared and/or in the visible and/or in the ultraviolet range.

In particular:

The terahertz device can include a first waveguide which is a plasmonic waveguide including:
  a first core including a nonlinear material, in particular a ferroelectric material; and
  a cladding including a first cladding portion including, at a first interface with the first core, in particular with the nonlinear material, a first cladding material that is an electrically conductive material.

And the terahertz device can include:
  an antenna having a first and a second arm (for receiving or for emitting or for both, receiving and emitting electromagnetic waves in the terahertz range);
  a first and a second electrode arranged close to the first waveguide.

The terahertz device can be a device for detecting electromagnetic waves in the terahertz range.

In some embodiments, the terahertz device is a device for emitting electromagnetic waves in the terahertz range.

In some embodiments, the terahertz device is a device for both, detecting and emitting electromagnetic waves in the terahertz range.

Under "terahertz range", we understand, as is common, the frequency range from 0.1 THz to 10 THz, or more particularly from 0.3 THz to 10 THz.

The non-linear material is, more specifically, a material that has a non-linear polarization response (in the respective frequency range, such as instantly in the optical range).

In some embodiments, the non-linear material is an electrically insulating material.

But alternatively, the non-linear material can also be an electrically conductive material, wherein in that case, the core can include an electrically insulating material arranged between the nonlinear material and the cladding.

The nonlinear material can be a single-crystalline material. But it can also be an amorphous material, or it can be a nanostructured material.

In some embodiments, the nonlinear material is a single-crystalline material.

In some embodiments, the nonlinear material is a polycrystalline material/single crystalline In some embodiments, the nonlinear material is a ferroelectric single crystal.

The first cladding material can be a material having a permittivity having a negative real part (in the THz range).

The first cladding material can be metallic or a semimetallic, e.g., can be a highly doped semiconductor.

The first and second arms can be distinct from and electrically connected to or identical with the first and the second electrodes, respectively.

The terms "lateral" and "vertical" as used in the present patent application refer to the wafer that is a substantially disk- or plate-like shaped item having in one direction (vertical direction) an extension (thickness) which is small with respect to its extension in the other two directions (lateral directions).

In some embodiments, the device comprises, in addition, a second waveguide including a second core positioned in proximity to the first waveguide, for enabling coupling (e.g., an evanescent coupling) between the first and second waveguides.

The second waveguide can be a photonic waveguide. But it can also be a plasmonic waveguide, or it can be a plasmonic-photonic hybrid waveguide. The second waveguide can be used to guide and couple to the first waveguide, so as to provide and to receive a probe signal in case terahertz electromagnetic waves are detected using the device, or, in case the device is used to generate terahertz electromagnetic waves, so as to provide a pump signal to the first waveguide, such as a pump signal including pulses or a pump signal including two or more optical frequencies. Due to the non-linearity of the nonlinear material, the two or more frequencies can be transformed (by the first waveguide) to include a sum and (rather) a difference frequency which is in the terahertz range.

In some embodiments, the device includes an optical structure, in particular a diffractive optical structure, for enhancing a coupling between free-space electromagnetic waves (such as free-space electromagnetic waves in the infrared, in the visible or in the ultraviolet range) and the first waveguide. E.g., the optical structure can be a focusing optical structure. For example, pump signals can be efficiently provided to the first waveguide.

Manufacturing the above or other terahertz devices can be accomplished using a technique with wafer bonding. A first wafer is bonded to a second wafer, wherein the nonlinear material is included in the first wafer. The first wafer can be made of the nonlinear material or, in other embodiments, can include the nonlinear material and, in addition, one or more further layers of other material.

E.g., the method for manufacturing a terahertz device (which can be, e.g., a device as herein described) can in particular include:
- providing a first wafer, such as a silicon-on-insulator wafer or a single-crystalline silicon wafer;
- depositing on the first wafer a nonlinear material, in particular a ferroelectric material;
- providing a second wafer, such as a silicon-on-insulator wafer or a single-crystalline silicon wafer, optionally with an adhesion layer;
- bonding the first wafer to the second wafer, so as to obtain a stacked wafer, thereby burying the nonlinear material, e.g., such that the nonlinear material interfaces the second wafer.

The depositing can be accomplished (e.g., epitaxially), for example by laser ablation, molecular beam epitaxy, sputtering or other vacuum deposition techniques.

Or, e.g., the method for manufacturing a terahertz device (which can be, e.g., a device as herein described) can in particular comprise:
- providing a first wafer made of a nonlinear material, in particular of a ferroelectric material, optionally with an adhesion layer;
- providing a second wafer, such as a silicon-on-insulator wafer or a single-crystalline silicon wafer, optionally with an adhesion layer;
- bonding the first wafer to the second wafer, so as to obtain a stacked wafer.

The invention includes devices with features of corresponding methods according to the invention, and, vice versa, also methods with features of corresponding devices according to the invention.

The advantages of the devices basically correspond to the advantages of corresponding methods, and, vice versa, the advantages of the methods basically correspond to the advantages of corresponding devices.

Further embodiments and advantages emerge from the following description and the enclosed figures and from the dependent claims.

BRIEF DESCRIPTION OF THE DRAWINGS

Below, the invention is described in more detail by means of examples and the included drawings. In the drawings, same reference numerals refer to same or analogous elements. The figures show schematically.

DETAILED DESCRIPTION OF THE INVENTION

The described embodiments are meant as examples or for clarifying the invention and shall not limit the invention.

First Embodiments

Figure 1:
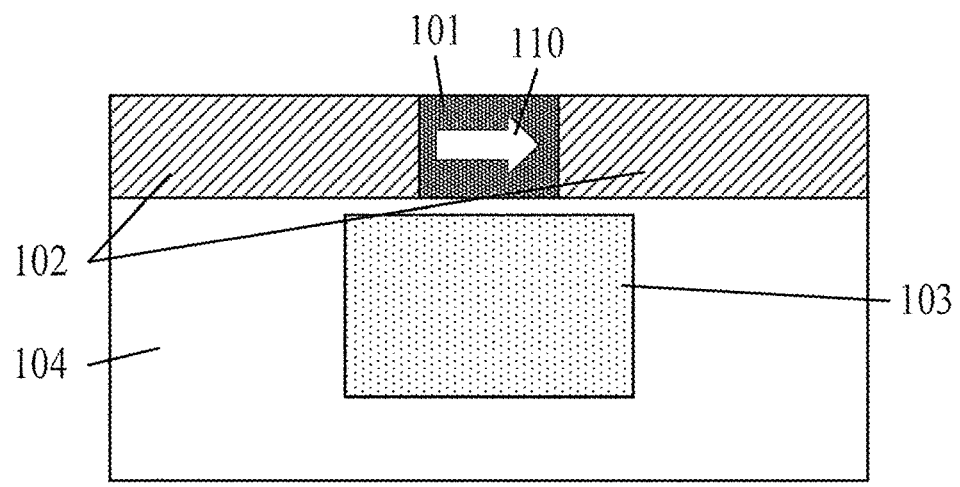
FIG. 1 (a) and FIG. 1 (b) are a cross sectional view of examples of nonlinear elements. It illustrates a nonlinear element loaded terahertz wave antenna gap forming a metal-insulator-metal plasmonic slot waveguide based on ferroelectric material.
Figure 1:
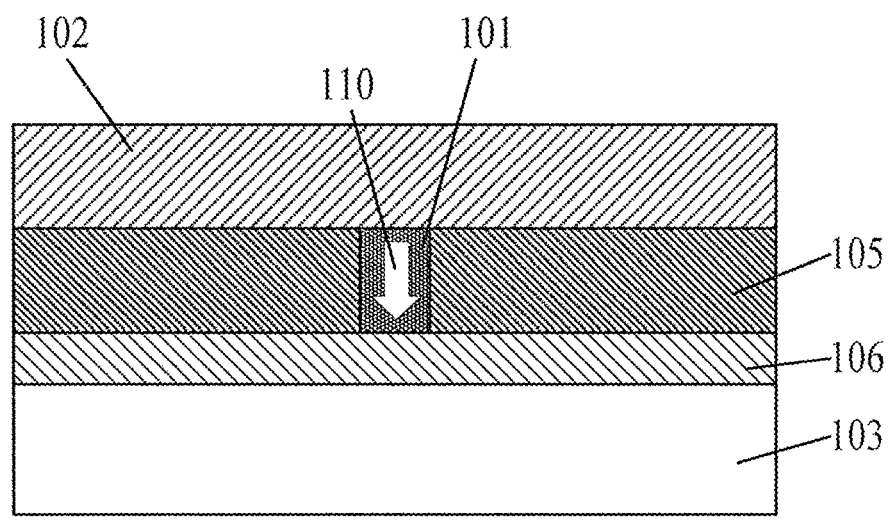

FIGS. 1 (a) and 1 (b) show cross-sectional views illustrating examples of a nonlinear elements, more specifically the terahertz antenna arms forming the plasmonic slot waveguide for the propagation of optical signals. The cross-section is taken from the transverse plane of waveguide propagation.

FIG. 1 (a) illustrates structured nonlinear material 101 with two metal electrodes 102 forming a plasmonic slot, and providing conductive material for the terahertz antenna. A (second) photonic waveguide 103 buried in the substrate 104 provides an access waveguide for optical pump signals. Light propagating in the higher refractive index material defining the photonic waveguide 103, is evanescently coupled to the plasmonic slot waveguide. The optical energy now propagates as surface plasmon polaritons (SPP) at the metal-insulator-metal interface. The electric field of the propagating plasmonic mode is symbolized by an arrow 110. The plasmonic nature of the slot waveguide provides extreme sub-diffraction confinement of the optical field allowing an electrode spacing on the order of 100 nm. This strong confinement of the optical pump signals leads to very strong optical intensities, essential for strong nonlinear effects.

When two optical pump signals co-propagate along the nonlinear material loaded plasmonic waveguide, strong second order nonlinear interaction between the two optical pump signals result in sum and difference frequency generation. If the two carriers are non-equal, the resulting new signal from the difference frequency generation is equal to the relative frequency offset of the two optical pump signals.

This offset can be set to the desired terahertz frequency. The resulting terahertz field leads to charge oscillation in the electrodes resulting in an oscillating current in the conductive electrodes and efficient radiation in the far field by the terahertz antenna. In another instance, the nonlinear third order effect may be exploited to generate a terahertz signal by means of fourwave mixing. These implementations can act as an efficient terahertz wave generation device.

On the other hand, a terahertz wave incident onto the antenna results in a voltage across the two electrodes 102, and thus the antenna arms. This voltage across the nano-scale antenna gap leads to very strong terahertz electric fields in the nonlinear material 101 with same polarization orientation as an optical probe signal propagating along the plasmonic waveguide 110. The almost perfect overlap between the optical and the terahertz electric fields, and the strong field enhancement provided by the nano-scale slot, result in a very strong and efficient nonlinear interaction between the optical and terahertz signals in the nonlinear material for terahertz wave detection. This implementation provides an efficient way to map the information contained in the terahertz on an optical carrier, providing an efficient terahertz wave detection.

FIG. 1 (b) illustrates a vertical metal-insulator-metal waveguide. A bottom conductive electrode 106 such as a metal, a semimetal or transparent conductive oxide (TCO) is deposited on a substrate 103. The nonlinear material 101 on top of the first electrode can be structured, e.g., nanorods, or simply a thin fil. In case of a structured nonlinear material 101, an insulating layer 105 can be present. The top electrode 102 is acting as a top cladding. In such a vertical MIM waveguide, coupled/in light would propagate as SPP confined between the top and bottom electrodes. Choosing a dielectric cladding 105 with a smaller refractive index as the nonlinear material 101, gives additionally a horizontal confinement. The electric field of the SPP are polarized in the vertical direction as shown by the arrow 110. Such a structure would provide a very strong sub-wavelength confinement of optical signals, resulting in strong nonlinear interactions in the nonlinear material.

Second Embodiment

Figure 2:
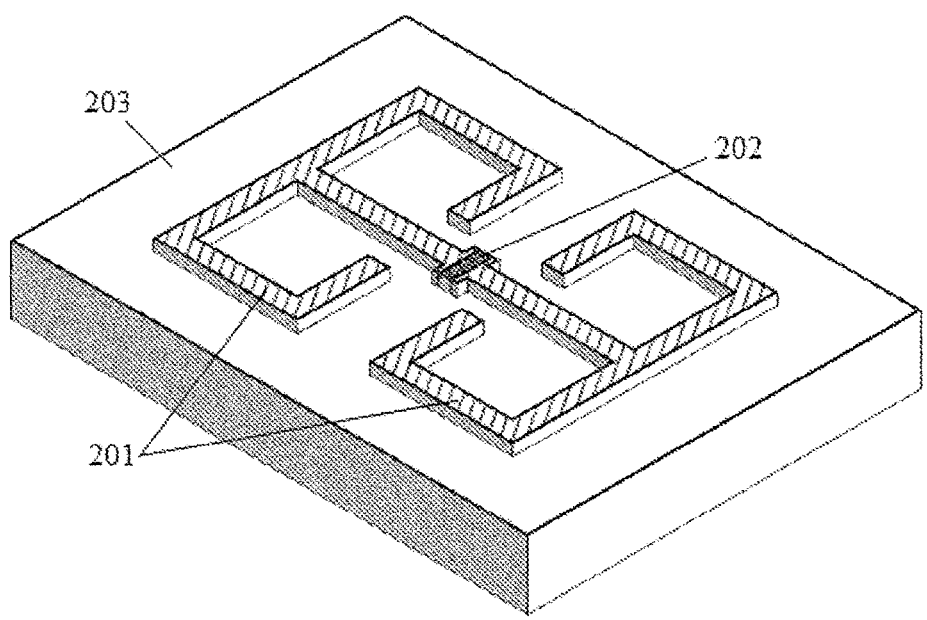
FIG. 2 illustrates a perspective view of an example of a terahertz detection and generation device including of a plasmonic waveguide and a terahertz antenna.

FIG. 2 illustrates a perspective view of an example of a terahertz detection and generation device including a plasmonic waveguide and a terahertz antenna. The plasmonic waveguide is a metal-insulator-metal (MIM) slot waveguide formed by the antenna arms 201 and the nonlinear material as the core 202, present on a substrate 203. The metal can be either a metal or a semimetal. The antenna includes two antenna arms 201 in form of four-clover-leave shape. Many other possible antenna shapes would work similarly, e.g., Bow-Tie and Yagi-Uda antennas. The core material 202 is, e.g., a second order nonlinear ferroelectric material, polymer or crystal. The nonlinear material could also rely on a third order nonlinear effect. Excited surface plasmon polaritons (SPP) propagating along the MIM slot waveguide are strongly confined inside of the plasmonic waveguide, leading to very high optical intensities in the nonlinear material. Two propagating SPP in the plasmonic slot result in generation of sum- and difference-frequency signals. Of interest for terahertz generation is mainly the difference-frequency generation (DFG) of two SPP with optical frequency SPP. The resulting terahertz field is efficiently radiated in the far field by the terahertz antenna. This implementation would act as an efficient terahertz wave generation device.

A terahertz wave incident on the antenna induces an oscillating current in the conductive antenna arms. Electrical charges accumulate at the antenna gap, resulting in a voltage across the slot. The voltage across the nano-scale slot results in a very strong terahertz electric field in the nonlinear material 202. In addition, the resonant nature of the antenna additionally enhances the terahertz electric field in the nonlinear material. The resulting terahertz electric field in the nonlinear material can interact with a propagating SPP of optical frequencies, and translate the information carried by the incident terahertz wave to the optical signal by means of sum-frequency generation.

Third Embodiments

Figure 3:
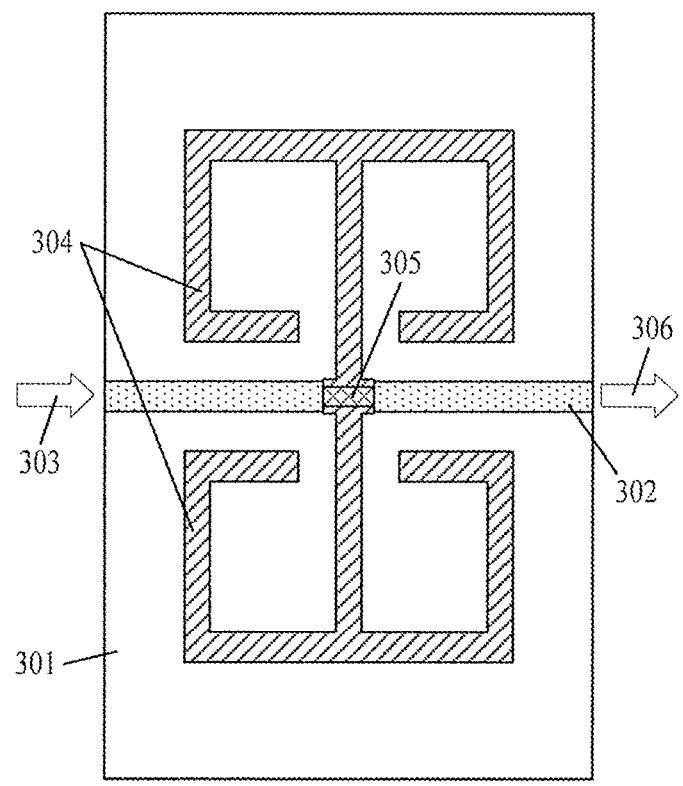
FIG. 3 (a) and FIG. 3 (b) show cross-sectional illustrations of possible coupling schemes between free-space electromagnetic waves and the first waveguide, i.e., the plasmonic waveguide.
Figure 3:
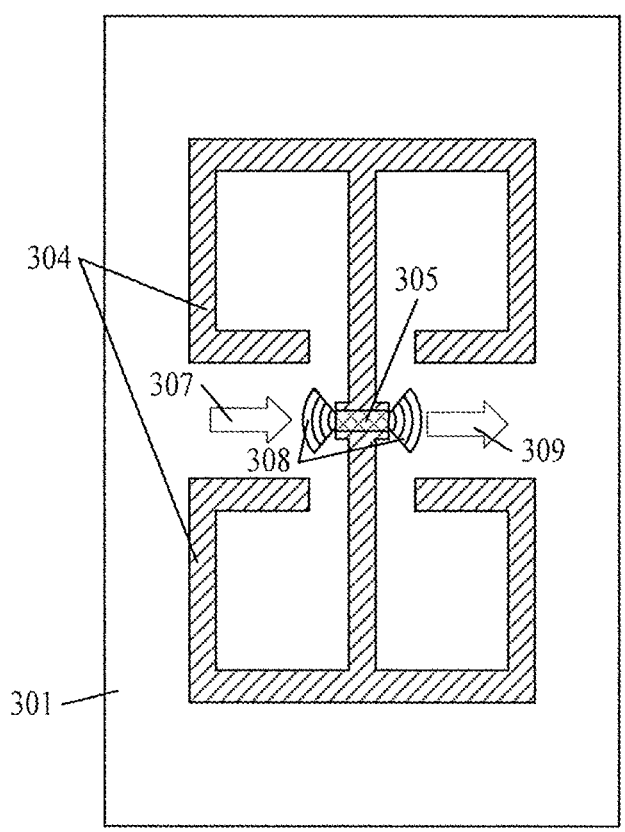

FIGS. 3 (a) and 3 (b) show cross-sectional illustrations of possible coupling schemes between free-space electromagnetic waves, in particular infrared, visible or ultraviolet light, and the first waveguide, i.e. the plasmonic waveguide.

FIG. 3 (a) illustrates one embodiment in which the top silicon layer of a silicon-on-insulator (SOI) wafer 301 is selectively etched to pattern (second) photonic waveguides 302. This photonic waveguide is used to guide optical signals, e.g., coupled from a laser or fiber by means of grating coupler or edge coupling 303. In proximity to the plasmonic waveguide, the optical signal from the photonic waveguide couples to the plasmonic evanescently. In addition, the silicon waveguide 302 is tapered down to enhance the coupling efficiency from the photonic waveguide to the metal-insulator-metal (MIM) interface formed by the terahertz antenna arms 304 and the core 305 including the nonlinear material, i.e., formed by plasmonic waveguide. These SPP strongly confined to the nonlinear material 305 propagate along the MIM slot waveguide, providing, as described for FIGS. 1(a) and 1(b), strong nonlinear interaction between propagating SPP and terahertz field. The propagating SPP, can evanescently couple back to the photonic waveguide at the end of the plasmonic waveguide. These optical signals can be coupled out to a fiber or camera 306 for temporal or spectral analysis.

FIG. 3 (b) illustrates an efficient coupling scheme between a free-space optical signal 307, and a plasmonic slot waveguide 305, by means of a diffractive optical element 308. In this embodiment, the optical element is in close proximity with the plasmonic slot waveguide and structured in form of a focusing grating made of silicon. A free-space optical signal is diffracted by the grating and focused towards the plasmonic slot. At the edges of the optical element, the optical signal is evanescently coupled to the metal-insulator-metal interfaces. This provides an efficient scheme for coupling free-space electromagnetic waves in (307) and out (309) of the plasmonic waveguide.

Fourth Embodiment

Figure 4:
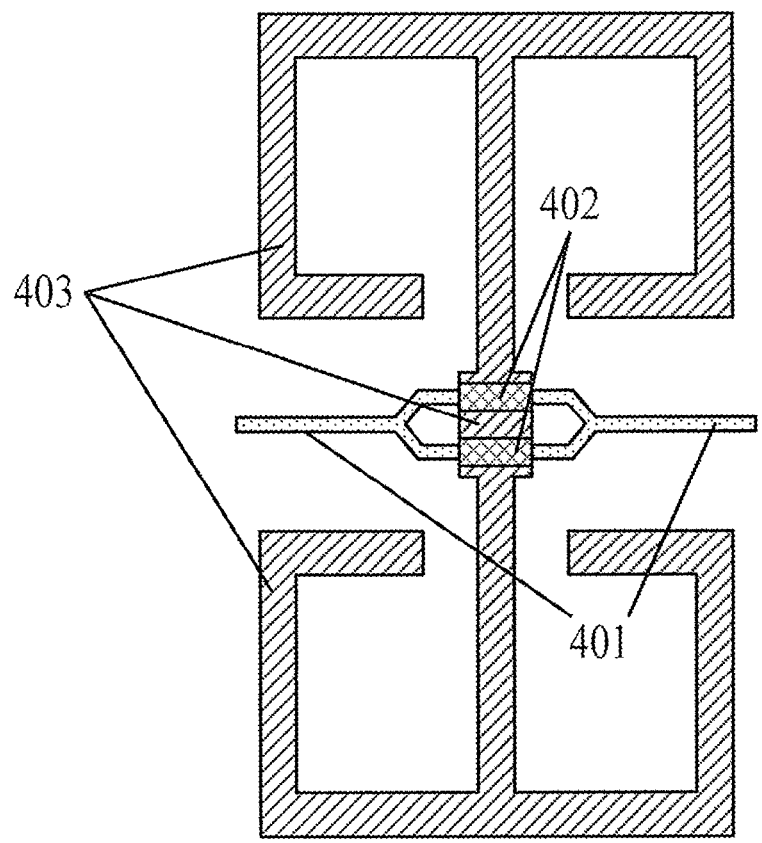
FIG. 4 shows an implementation example of a terahertz detector with an integrated Mach-Zehnder interferometer.

FIG. 4 shows an implementation example of a terahertz detector with an integrated Mach-Zehnder interferometer. This enables direct translation of the terahertz information to an amplitude modulation of an optical carrier signal (probe signal). In this embodiment, the optical signal guided by a silicon waveguide 401 is split in two path, e.g., by a Y-splitter or multi-mode interferometer (MMI). Both silicon waveguide branches couple evanescently in close proximity with a (first) plasmonic waveguide. The plasmonic waveguide includes the nonlinear material 402 and conductive electrodes, formed by portions of the antenna arms 403. The two inner electrodes interface both waveguide cores, thus functioning as claddings. The two antenna arms form the outer electrodes. An incident terahertz wave produces a voltage across both antenna gaps, which contain the nonlinear material 402. The terahertz electric field in the nonlinear material 402 changes the real part of the refractive index, thus inducing a phase shift of the optical signal (probe signal) proportional to the applied voltage. By applying an opposite bias voltage between the outer and inner electrodes of the two plasmonic slot, an opposite phase shift can be induced. An induced n-phase shift difference between both plasmonic waveguides would result in destructive interference at the output combiner. This way one can modulate the intensity of the optical probe signal.

Manufacturing Methods

Figure 5:
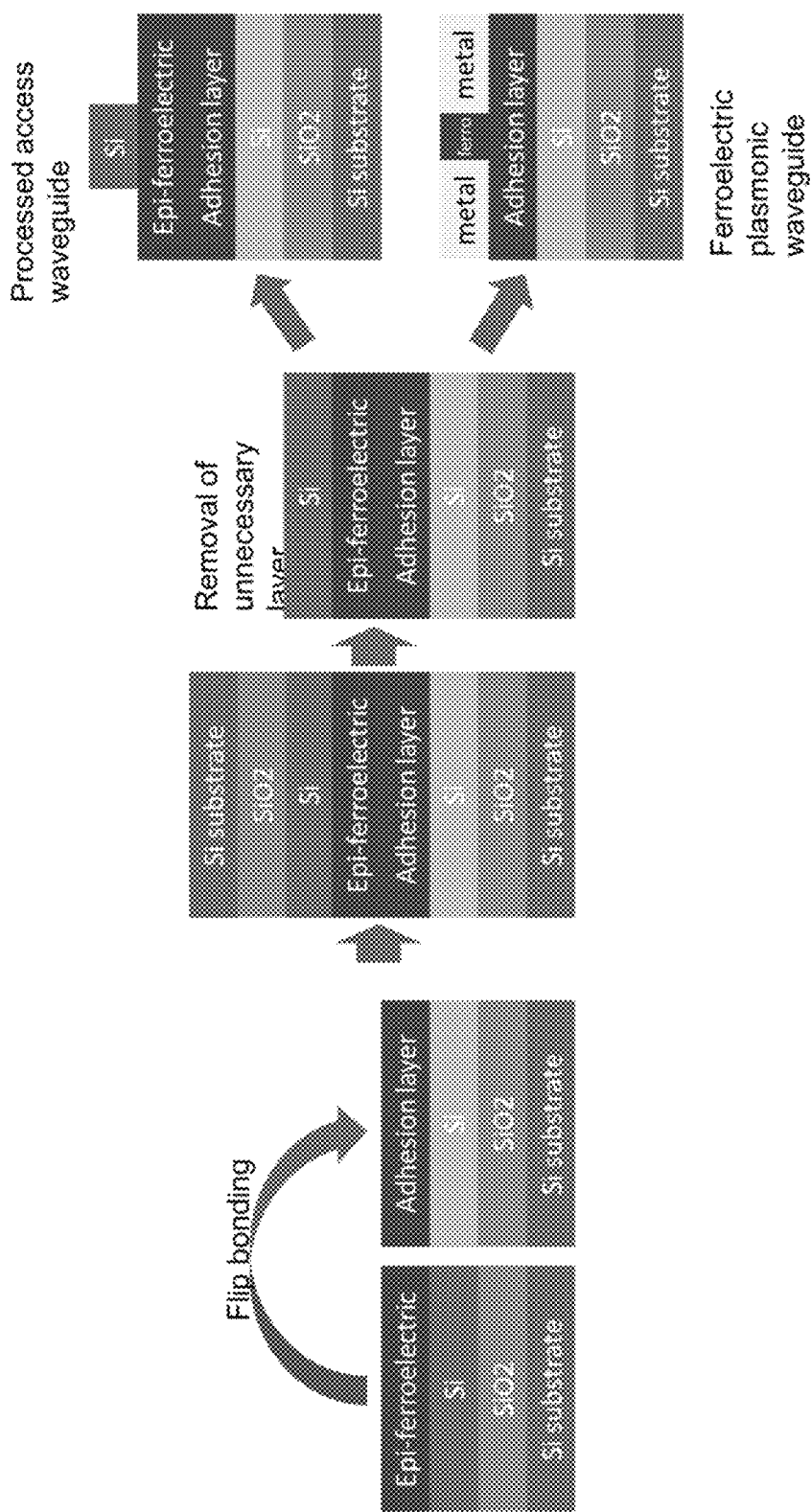
FIG. 5 schematically illustrates a method for manufacturing a terahertz device.

FIG. 5 schematically illustrates a method for manufacturing a terahertz device. Two wafers are bonded to each other, wherein the first wafer includes a layer of a nonlinear material (indicated in FIG. 5 as "Epi-ferroelectric), which can be, e.g., an epitaxially grown layer of a ferromagnetic material. In the obtained wafer (referred to as stacked wafer), the layer of nonlinear material is buried. In a next step, possibly existing layers which are not required in the terahertz device are removed.

In further steps, the nonlinear material is structured so as to form a waveguide core (of a first—plasmonic—waveguide), and a layer of the second wafer is structure so as to form another waverguide core (of a second waveguide, such as a waveguide for probing and/or pumping). Alternatively to forming the second core from a layer of the second wafer, it is also possible to deposit further material on the stacked wafer and to produce the second core from that further material.

Electrodes are produced close to the first core, e.g., by selective metal deposition.

In an alternative method, the first wafer is made of the nonlinear material (possibly with an adhesion layer added). In that case, it is possible to structure the core of the second waveguide from a layer of the second wafer, such as from the layer below the (optional) adhesion layer, such as from the layer indicated "Si" in FIG. 5.

The invention claimed is:

1. A terahertz device for detecting or for emitting or for both, detecting and emitting electromagnetic waves in the terahertz range, the device comprising a first waveguide which is a plasmonic waveguide comprising
a first core comprising a nonlinear material; and
a cladding comprising a first cladding portion comprising, at a first interface with the first core, a first cladding material which is an electrically conductive material; and
the device comprising
an antenna having a first and a second arm, for receiving or for emitting or for both, receiving and emitting electromagnetic waves in the terahertz range;
a first and a second electrode arranged close to the first waveguide.

2. The device according to claim 1, wherein the device is a terahertz emitter for emitting electromagnetic waves in the terahertz range, and wherein the first and second electrodes are provided for picking up an electric field present in the nonlinear material.

3. The device according to claim 1, wherein the device is a terahertz detector for detecting electromagnetic waves in the terahertz range, and wherein the first and a second electrodes are provided for producing an electric field in the nonlinear material when a voltage is applied between the first and second electrodes, for modulating an optical property of the nonlinear material.

4. The device according to claim 1, wherein the first electrode establishes the first cladding portion.

5. The device according to claim 1, wherein the cladding comprises a second cladding portion separate from the first cladding portion, comprising, at a second interface with the first core, a second cladding material which is an electrically conductive material.

6. The device according to claim 5, wherein the nonlinear material is arranged between the first and second cladding portions.

7. The device according to claim 1, comprising, in addition, a second waveguide comprising a second core positioned in proximity to the first waveguide, for enabling coupling between the first and second waveguides.

8. The device according to claim 7, comprising a substrate comprising one or more substrate layers, wherein both, the first and the second waveguide, are located on and attached to the substrate.

9. The device according to claim 7, wherein the device comprises the first waveguide on a substrate, wherein the second waveguide is a photonic waveguide, and wherein at least one of the following applies:
the second waveguide is arranged vertically between the substrate and the first waveguide;
the second waveguide is buried in the substrate;
the device comprises an integrated Mach-Zehnder interferometer by the second waveguide being split in two branches, wherein both branches are arranged to couple evanescently in close proximity with a first waveguide, wherein the device comprises two inner electrodes that function as claddings and two outer electrodes formed by the antenna arms.

10. The device according to claim 1, comprising an optical structure for enhancing a coupling between free-space electromagnetic waves and the first waveguide.

11. The device according to claim 10, wherein the optical structure is provided for focusing the free-space electromagnetic waves into an end of the first waveguide.

12. The device according to claim 10, wherein the optical structure comprises a first part and a second part, for enhancing a coupling of free-space electromagnetic waves to a first end and to a second end, respectively, of the first waveguide.

13. The device according to claim 10, wherein the optical structure is an optical structure exhibiting a variation of optical properties on distances below 100 micrometers.

14. A method for manufacturing a terahertz device, the method comprising
providing a first wafer;
depositing a nonlinear material on the first wafer;
providing a second wafer;
bonding the first wafer to the second wafer, so as to obtain a stacked wafer, thereby burying the nonlinear material; and
providing an antenna having a first arm and a second arm, for receiving or for emitting or for both, receiving and emitting electromagnetic waves in the terahertz range.

15. The method according to claim 14, further comprising
removing a portion of the first wafer from the stacked wafer.

16. The method according to claim 14, comprising structuring the nonlinear material comprised in the stacked wafer to produce a first core of a first waveguide.

17. The method according to claim 16, comprising producing a cladding comprising a first cladding portion comprising, at a first interface with the structured nonlinear material, a first cladding material which is an electrically conductive material.

18. The method according to claim 14, wherein the depositing of the nonlinear material comprises epitaxially growing the nonlinear material on the first wafer.

19. The method according to claim 14, comprising, after the bonding, producing a second core of second waveguide.

20. The method according to claim 14, comprising producing on the stacked wafer a first waveguide which is a plasmonic waveguide, and depositing on the structured wafer a material to form an optical structure for enhancing a coupling between free-space electromagnetic waves and the first waveguide.

21. A method for manufacturing a terahertz device, the method comprising providing a first wafer made of a nonlinear material;

providing a second wafer;

bonding the first wafer to the second wafer, so as to obtain a stacked wafer; and providing an antenna having a first and a second arm, for receiving or for emitting or for both, receiving and emitting electromagnetic waves in the terahertz range.

22. The method according to claim 21, comprising structuring the nonlinear material comprised in the stacked wafer to produce a first core of a first waveguide.

23. The method according to claim 21, comprising producing a cladding comprising a first cladding portion comprising, at a first interface with the structured nonlinear material, a first cladding material which is an electrically conductive material.

24. The method according to claim 21, comprising, after the bonding, producing a second core of second waveguide, wherein the second core comprises material of a layer of the second wafer and producing the second core comprises structuring said layer.

* * * * *